United States Patent [19]

Yokonuma et al.

[11] Patent Number: 6,072,186

[45] Date of Patent: Jun. 6, 2000

[54] FILM PICTURE IMAGE VIEWING APPARATUS

[75] Inventors: Norikazu Yokonuma; Kazuyuki Kazami, both of Tokyo; Hideo Hibino, Kawasaki; Hisashi Okutsu, Yokohama, all of Japan

[73] Assignee: Nikon Corporation, Tokyo, Japan

[21] Appl. No.: 08/906,823

[22] Filed: Aug. 6, 1997

[30] Foreign Application Priority Data

Aug. 20, 1996 [JP] Japan .................................... 8-218620

[51] Int. Cl.$^7$ .............................. H04N 1/036; G03B 27/52
[52] U.S. Cl. ...................... 250/559.02; 355/40; 396/311; 362/16
[58] Field of Search .................... 250/559.02; 362/16, 362/217, 218, 294, 342, 343, 345, 347; 355/38, 40, 218; 396/311, 116, 315, 319; 360/3

[56] References Cited

U.S. PATENT DOCUMENTS

| | | | |
|---|---|---|---|
| 4,412,276 | 10/1983 | Blinow | 362/16 |
| 4,460,942 | 7/1984 | Pizzuti et al. | 362/217 |
| 4,482,924 | 11/1984 | Brownstein . | |
| 4,965,627 | 10/1990 | Robison . | |
| 5,417,265 | 5/1995 | Shibata et al. | 355/40 |
| 5,883,698 | 3/1999 | Kimura | 396/311 |

FOREIGN PATENT DOCUMENTS 4-273240  9/1992  Japan .

Primary Examiner—Stephone Allen
Attorney, Agent, or Firm—Oliff & Berridge, PLC

[57] ABSTRACT

A film picture image viewing apparatus minimizes the effects of noise by prohibiting operation of an illumination device whenever a reading or a playback device is operated. The film picture image viewing apparatus includes a support substrate. The illumination device includes a discharge tube and a reflector. The discharge tube provides light when energized. The reflector is anchored to the support substrate and has a pair of oppositely-disposed ends with a receiving hole formed in each end. Each of the receiving holes is sized to receive the discharge tube in a manner to minimize thermal conduction from the discharge tube to the reflector after the discharge tube becomes energized.

20 Claims, 6 Drawing Sheets

FILM PICTURE IMAGE VIEWING APPARATUS

Incorporation by Reference

The disclosure of the following priority application is herein incorporated by reference:

Japanese Application No. 08-218620 filed on Aug. 20, 1996.

BACKGROUND OF THE INVENTION

1. Field of Invention

The present invention relates to an apparatus that views picture images of photographic film by displaying such on a television or CRT.

2. Description of Related Art

Apparatus which view picture images of photographic film by projecting such onto a display apparatus such as a television or CRT or the like are known (for example, see U.S. Pat. No. 4,482,924). In this type of apparatus, the film picture image is imaged while being illuminated, but with a cold cathode discharge tube used as the illuminating light source.

In addition, film coated with a magnetic recording medium and capable of recording magnetic information also is known (for example, see U.S. Pat. No. 4,965,627).

However, a cold cathode discharge tube must be lighted by supplying high frequency and high voltage electric power. Consequently, a large amount of noise is generated from the cold cathode discharge tube and the lighting circuit thereof. Hence, when film capable of recording magnetic information is loaded into the film picture image viewing apparatus and reading and playback of magnetic information is carried out, a problem arises in that the noise created by the cold cathode discharge tube and the lighting circuit thereof intermixes with the magnetic information.

Of course, it is possible to prevent dispersion of the created noise by enclosing the cold cathode discharge tube and the lighting circuit thereof within a sealed case. However, this is not considered a desirable preventive approach because of cost and installation space requirements.

At the same time, the cold cathode discharge tube produces light in all directions covering 360° with the lengthwise direction of the tube defining an axis. A light collection method using a reflector such as is used in strobes for photography, flashlights or the like, has been used to collect the light from this kind of light source into a single direction.

In addition, cold cathode discharge tubes have a property that the lighting luminance is not stable until its temperature rises as a result of heat being generated by the tube itself.

As shown in FIG. 12, when a construction is used in which a reflector 102 and a cold cathode discharge tube 103 are anchored integrally onto a substrate 101 and electric power is supplied to the cold cathode discharge tube 103 by a lead wire 104, the heat of the discharge tube 103 is transferred to the reflector 102 and the reflector 102 becomes a heat sink and, thus heat escapes. Consequently, a problem arises that the temperature of the cold cathode discharge tube 103 does not rise readily, and time is required before the luminance is stable.

SUMMARY OF THE INVENTION

It is an object of the present invention to provide a film picture image viewing apparatus that eliminates the effects on magnetic reading and playback of the noise generated from a cold cathode discharge tube, and illuminates the film picture image by lighting the cold cathode discharge tube in a stable manner.

In order to achieve the above and other objects, a film picture image-viewing apparatus according to embodiments of the invention includes an imaging means (e.g., an electronic imaging device such as a CCD) that images the picture image of a film and outputs a projected image signal; a reading and playback means (e.g., a magnetic head and playback circuit) that reads and plays back magnetic information on the film; an illumination device that illuminates the film; and a controller that turns off the illumination device during reading or playback of the magnetic information by the reading and playback means.

The illumination device preferably is provided with a discharge tube and a reflector for collecting the light emitted from the discharge tube, and is constructed so as to minimize thermal conduction from the discharge tube to the reflector. The reflector anchors the discharge tube by means of a plurality of projection members or by means of a heat insulating member. Also, the reflector and the discharge tube can be anchored independently to a substrate so that they do not come into contact with each other.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
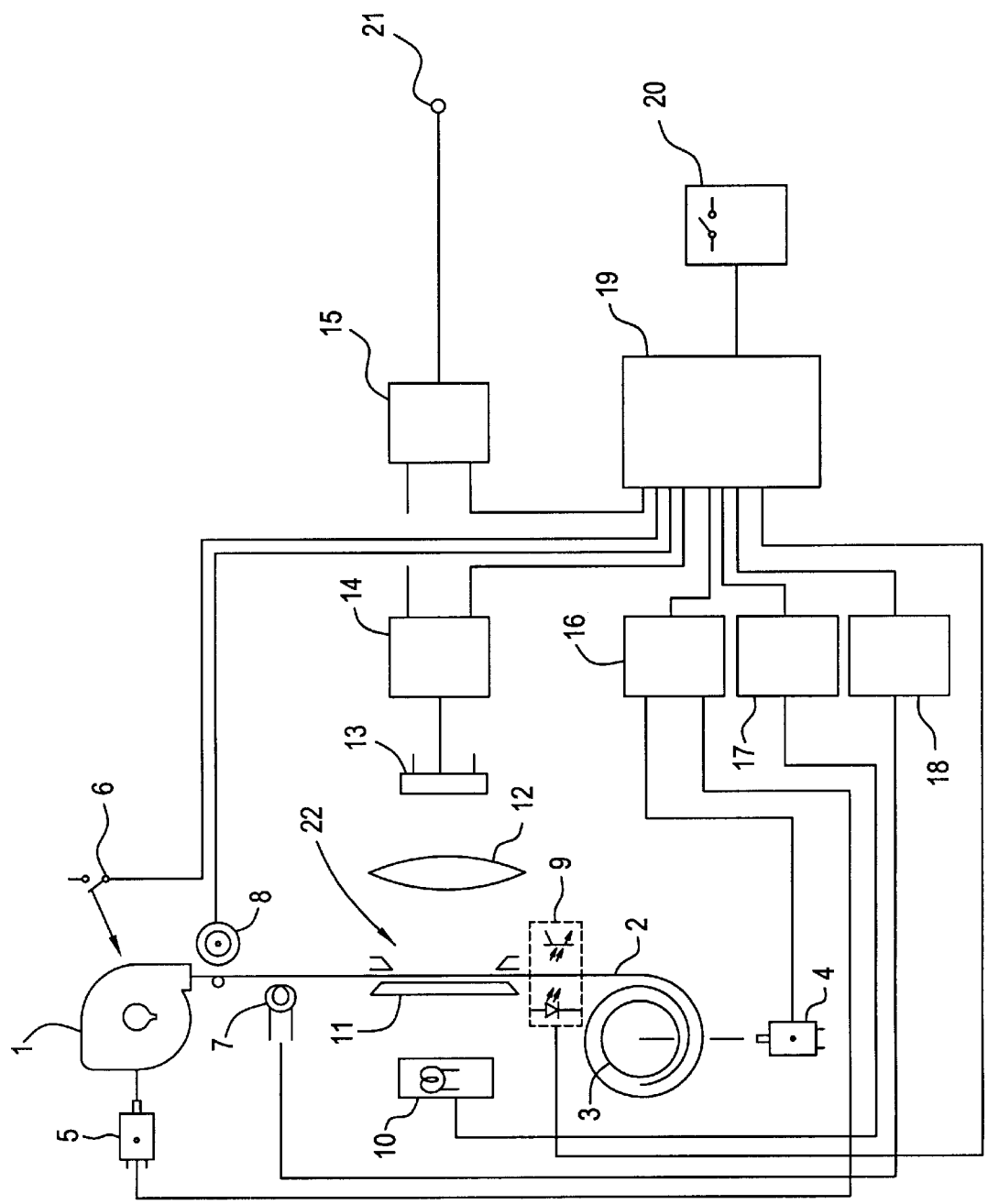
FIG. 1 is a schematic diagram showing a film picture image viewing apparatus incorporating an illumination light source of the present invention.

A cartridge 1 and film 2 are those of the type, for example, disclosed in Japanese Laid-Open Patent Publication 4-273240, wherein the film 2 is normally rewound completely into the cartridge 1, and the film 2 is scrolled out from the cartridge 1 and wound onto a spool when the picture images formed on the film 2 are viewed. Two perforations are formed on each photographic frame of the film 2, and the film 2 is supplied to a predetermined imaging position by detecting these perforations. In addition, a magnetic recording medium is coated onto the film 2, so that magnetic recording, reading and playback of photography information or the like is possible.

An advancing motor 4 drives a spool 3 to wind the film 2, and a rewinding motor 5 drives the spool of the cartridge 1 to scroll the film 2 from the cartridge 1 and to rewind the film 2 into the cartridge 1. A cartridge loading detection switch 6 operates when the cartridge 1 is loaded into a cartridge chamber (not shown).

A magnetic head 7 reads the magnetic information previously recorded on the film 2. A film encoder 8 rotates in conjunction with the movement of the film 2, and outputs a pulse signal for each predetermined amount of movement of the film 2. It is possible to detect the advanced distance and moving speed of the film 2 on the basis of this pulse signal. A photo interrupter 9 detects the perforations formed in the film 2. The position of the film 2 when the photo interrupter 9 detects the second perforation is the position where the center of the image of the photographic frame matches the center of an image area 22.

Light emitted from an illumination light source 10 is white and is dispersed by a dispersion board 11 and illuminates the film 2. The dispersion board 11 also serves as a pressure plate for the film 2. A photographic lens 12 causes the picture image of the image area 22 of the film 2 to be formed into an image on a CCD 13. The photographic lens 12 is, for example, a zoom lens with a changeable focal length. The CCD 13 images the picture image of the image area 22 of the film 2.

An imaging circuit 14 converts the signals read from the CCD 13 into video signals and outputs these video signals to a projected image control circuit 15. The projected image control circuit 15 processes the video signals, creates the desired picture image signals and outputs the desired picture image signals to an external display apparatus such as, e.g., a television or CRT (monitor). The film 2 has photography information such as a photography date magnetically recorded on each photographic frame, and the projected image control circuit 15 reads this magnetic information and superimposes it on the projected image of the film picture image.

A motor control circuit 16 controls driving of the motors 4 and 5, and an illumination control circuit 17 turns the illuminating light source 10 on and off. A playback circuit 18 controls driving of the magnetic head 7 to playback magnetic information recorded on the film 2. A CPU 19 accomplishes sequence control of the apparatus using various algorithms. An operation switch 20 provides an operation member used to indicate the action of the apparatus. A terminal 21 serves as a projected image output terminal for outputting the projected image signals to a display apparatus such as a television or CRT.

FIG. 2 through FIG. 7 show embodiments of the illumination light source 10.

Figure 2:
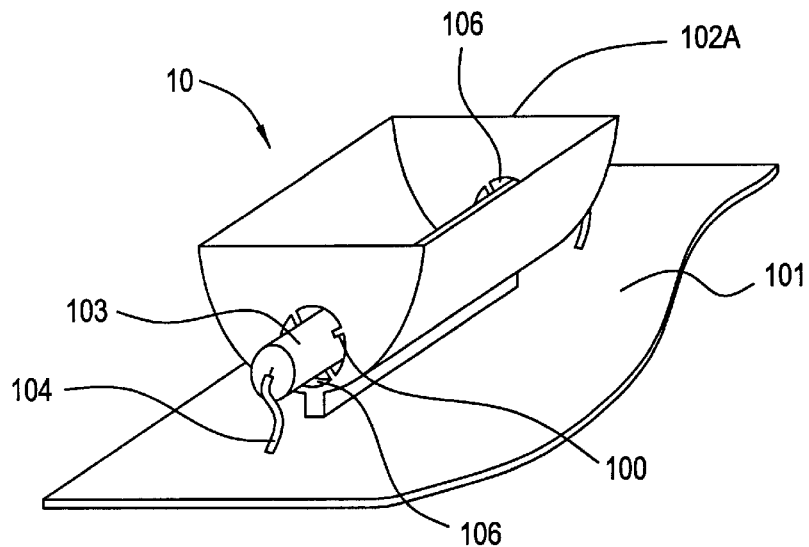
FIG. 2 is a perspective view showing a first embodiment of the illumination light source of the present invention.
Figure 3:
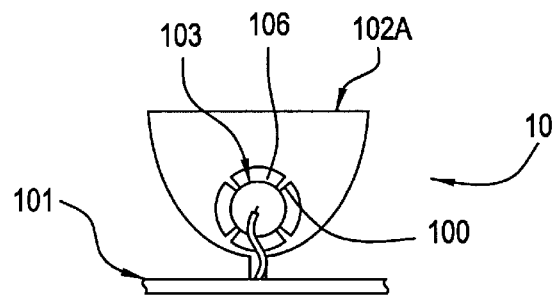
FIG. 3 is a side view of the illumination light source shown in FIG. 2.

FIG. 2 is a perspective view showing a first embodiment of the illumination light source 10, while FIG. 3 is a side view thereof. In this embodiment, a trough-shaped reflector 102A with a pair of oppositely-disposed receiving holes 106 is anchored to a support substrate 101 and a plurality of projection members 100 are formed in the reflector 102A to anchor or mount a discharge tube 103 in such a way that heat from the cold cathode discharge tube 103 does not easily escape to the reflector 102A. With this structure, the surface area of contact between the cold cathode discharge tube 103 and the reflector 102A is minimized because only distal ends of the projection members contact the discharge tube 103. Accordingly, thermal conduction from the cold cathode discharge tube 103 to the reflector 102A is reduced and heat discharge by the reflector 102A is minimized.

Figure 4:
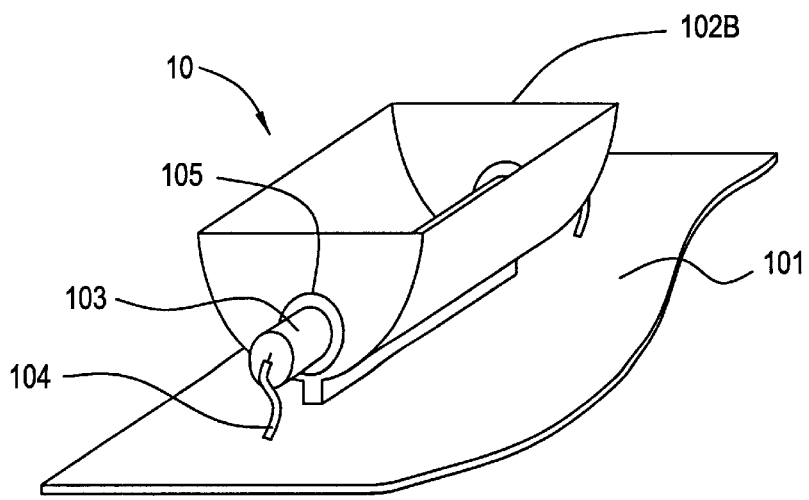
FIG. 4 is a perspective view showing a second embodiment of the illumination light source of the present invention.
Figure 5:
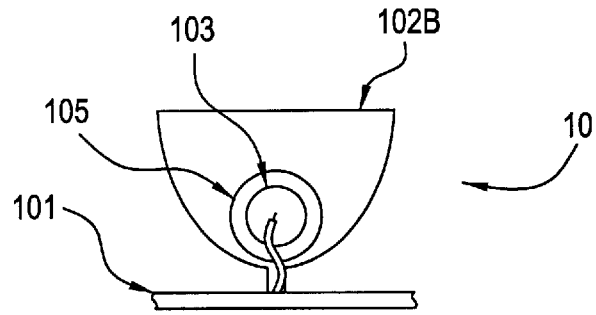
FIG. 5 is a side view of the illumination light source shown in FIG. 4.

FIG. 4 is a perspective view showing a second embodiment of the illumination light source 10, while FIG. 5 is a side view thereof. In this embodiment, a reflector 102B is anchored to the substrate 101 and the discharge tube 103 is anchored to the reflector 102B via a heat-insulating gasket member 105. Gasket member 105 can be made, e.g., from material such as silicone rubber or the like, so that the heat from the cold cathode discharge tube 103 does not easily migrate to the reflector 102B. Through this structure, thermal conduction from the cold cathode discharge tube 103 to the reflector 102B is reduced and heat discharge by the reflector 102B is minimized.

Figure 6:
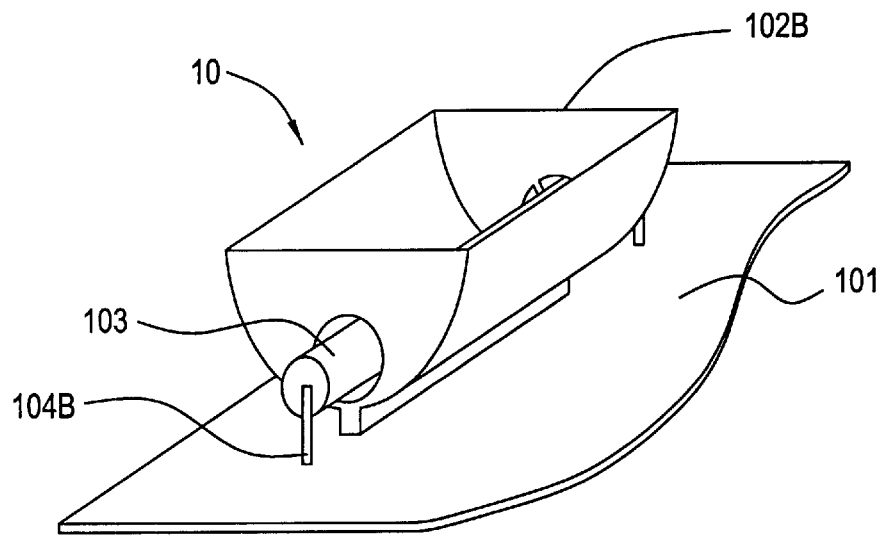
FIG. 6 is a perspective view showing a third embodiment of the illumination light source of the present invention.
Figure 7:
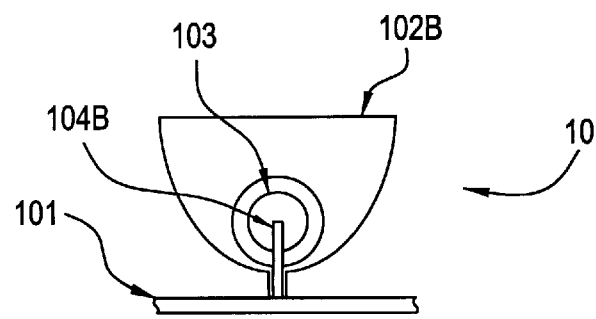
FIG. 7 is a side view of the illumination light source shown in FIG. 6.

FIG. 6 is a perspective view showing a third embodiment of the illumination light source 10, while FIG. 7 is a side view thereof. In this embodiment, the reflector 102B and the cold cathode discharge tube 103 are independently anchored to the substrate 101 so that the reflector 102B and cold cathode discharge tube 103 do not come into contact with each other. The cold cathode discharge tube 103 is anchored to the substrate 101 by a conductive metal terminal 104B. Through this structure, there is no thermal conduction from the cold cathode discharge tube 103 to the reflector 102B, and heat discharge by the reflector 102B is minimized.

Figure 8:
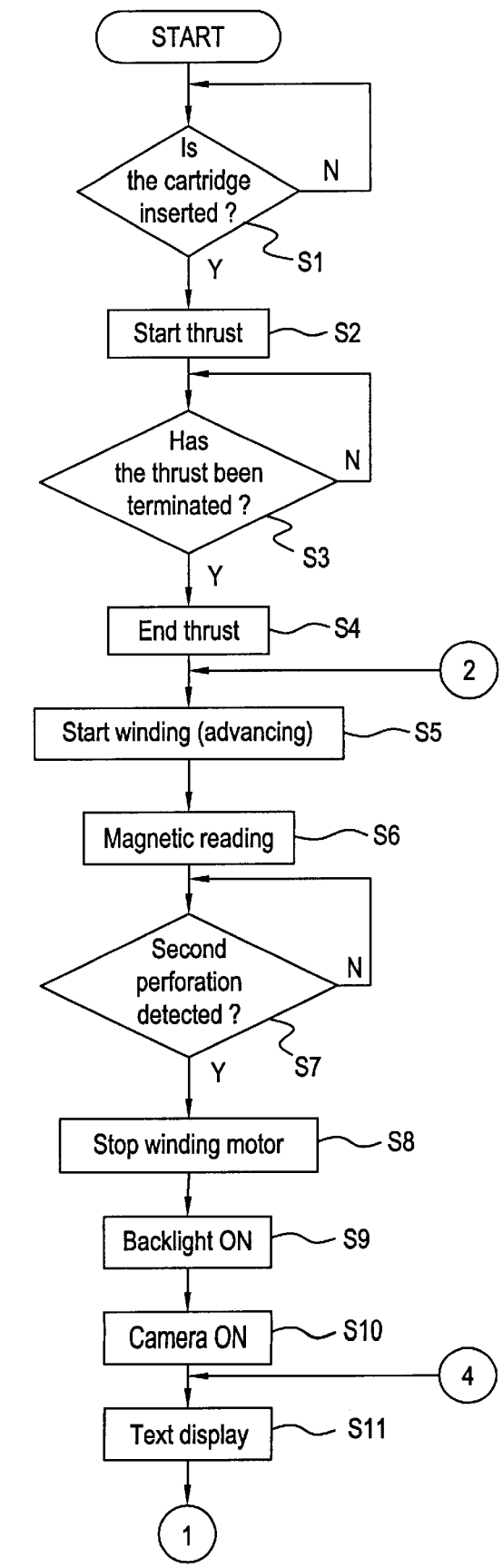
FIG. 8 is a flowchart of the operation of the film image viewing apparatus.
Figure 9:
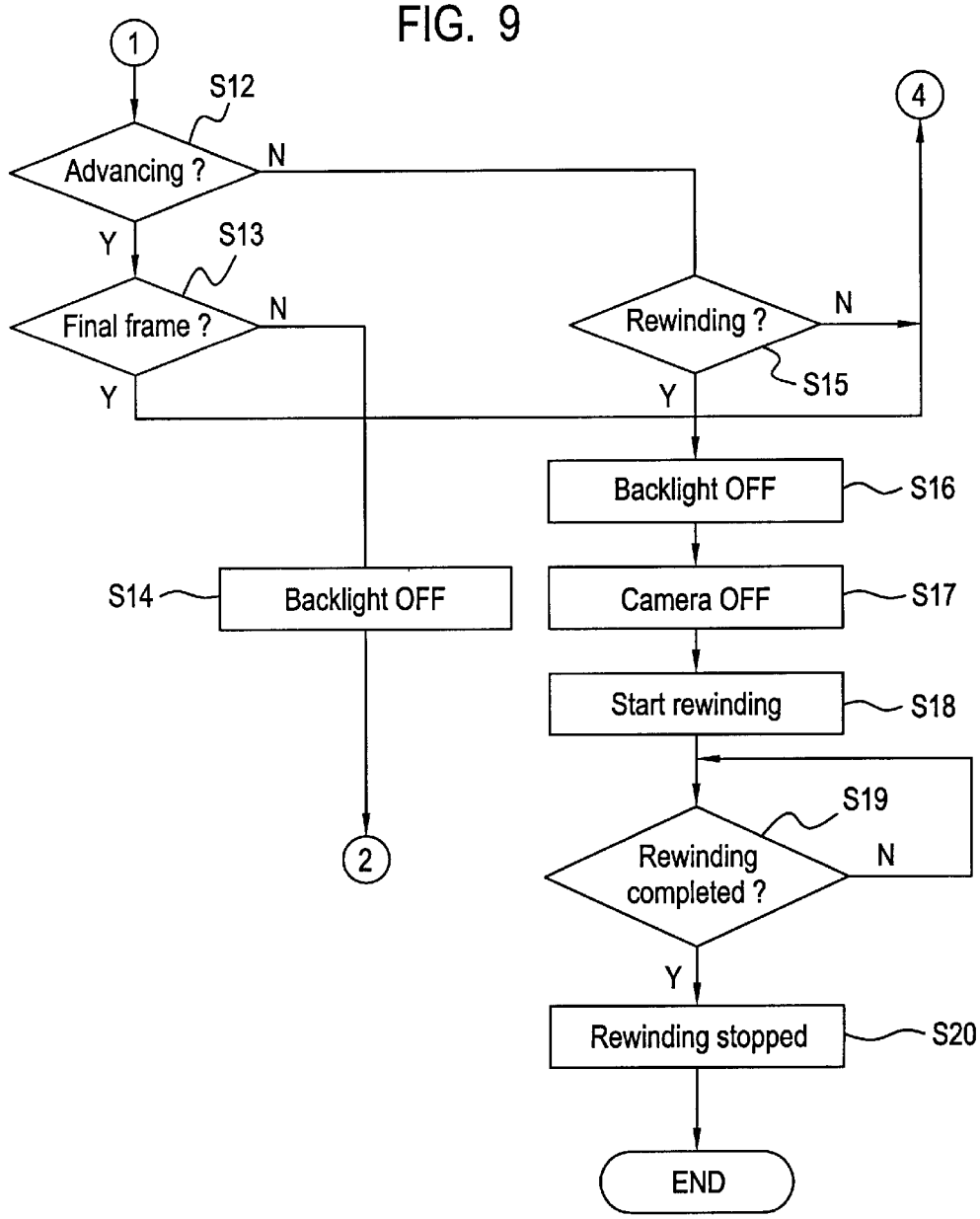
FIG. 9 is a flowchart of the operation of the film image viewing apparatus following FIG. 8.

FIG. 8 and FIG. 9 are flowcharts showing the actions of the embodiments.

In step S1, when loading of the cartridge 1 is detected by the cartridge loading detection switch 6, flow proceeds to step S2, where the so-called thrust is started with the rewinding motor 5 being rotated forward by the motor control circuit 16 and the film 2 scrolled out from the cartridge 1. In step S3, film encoder 8 detects whether the leader portion of the film 2 has reached the spool 3. When the leader portion of the film 2 has reached the spool 3, flow proceeds to step S4. In step S4, scrolling of the film 2 is halted and the thrust is ended.

In step S5, the advancing motor 4 is rotated forward by the motor control circuit 16 to begin advancing the film 2. In the ensuing step S6, reading of the magnetic information from the photographic frame supplied to the image area 22 is started by the playback circuit 18. At this time, the cold cathode discharge tube 103 has not yet been lighted and, consequently, there is no noise generation from the illumination light source 10. The magnetic information that is played back is stored in memory in the CPU 19. When the second perforation is detected by the photo-interrupter in step S7, the program advances to step S8 and the advancing motor 4 is halted. By this action, a photographic frame is set in the image area 22. In addition, at this time the playback of the magnetic information by the playback circuit 18 is concluded.

When playback of the magnetic information of the photographic frame is concluded and this frame is set in the image area 22, the illumination light source 10 is lighted (step S9) by the illumination control circuit 17, illuminating the film 2. At the point in time when the cold cathode discharge tube 103 of the illumination light source 10 is lighted, the playback of magnetic information has been concluded and, consequently, there is no intermixing of noise with the playback information. In step S10, the picture image of the film 2 is imaged by the CCD 13 and the imaging circuit 14.

Figure 10:
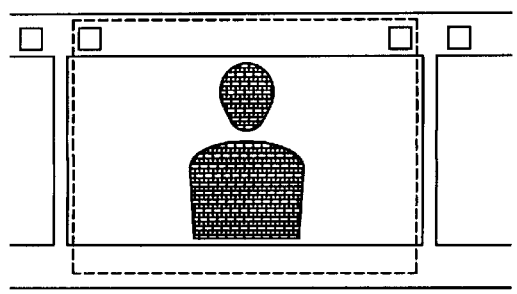
FIG. 10 is a front elevational view showing the relationship between the film picture image and the television screen.
Figure 11:
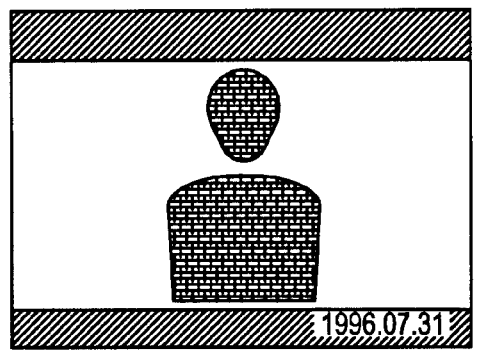
FIG. 11 is a front elevational view showing an example of the projected image of the film picture image projected onto the television screen.
Figure 12:
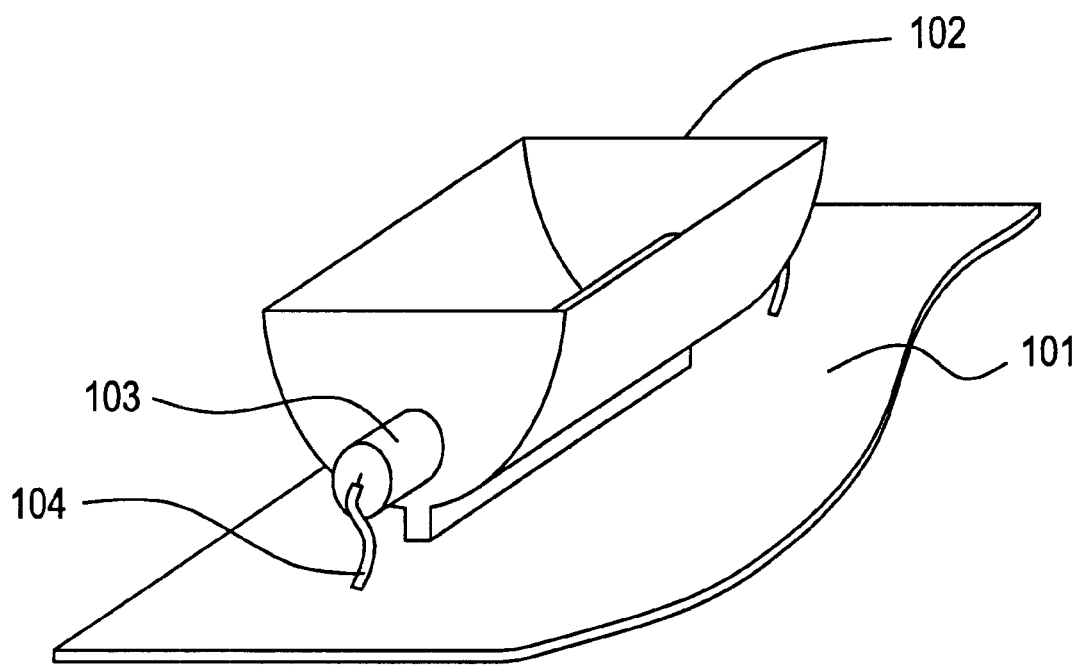
FIG. 12 is a perspective view showing an example of a conventional illumination light source.

In step S11, the top and bottom of the television screen are masked by the projected image control circuit 15 in order to compensate for differences in the vertical-to-horizontal ratios between the television screen and the film picture image. As shown in FIG. 10, the film picture image is longer horizontally than the television screen (indicated by the dashed lines in the drawing), so that if the film picture image is projected without change on the television screen, even unnecessary portions are projected. Hence, the top and bottom of the screen are electronically masked and the unnecessary portions are cut. Furthermore, the magnetic information read by the playback circuit 18 is read from memory and is superimposed on the projected image of the film picture image projected onto the television screen by the projected image control circuit 15. FIG. 11 shows an example wherein magnetic information containing the photograph date is displayed.

In step S12, when the advancing operation switch is operated, the program moves to step S13 where verification is made as to whether or not the final frame is set in the image area 22. When the final frame is set in the image area 22, the program returns to step S11 and the advancing operation input is canceled. When the frame is not the final frame, the program moves to step S14 and the illumination light source 10 is turned off by the illumination control circuit 17. When the illumination light source 10 is turned off, the supply of high-frequency and high-voltage electric power to the cold cathode discharge tube 103 is halted and, consequently, the generation of noise ceases. Following this step, flow returns to step S5 and the playback of magnetic information and imaging are accomplished for the next frame.

In step S15, when the rewinding operation switch is operated, flow proceeds to step S16, where the illumination light source 10 is turned off by the illumination control circuit 17. In the ensuing step S17, imaging by the CCD 13 and imaging circuit 14 is concluded. In step S18, the rewinding motor 5 is rotated in reverse by the motor control circuit 16, rewinding the film 2 into the cartridge 1. In step S19, the completion of rewinding is verified. When this has been completed, the rewinding motor 5 is halted in step S20 and the rewinding of the film 2 is completed.

In the structure of the above-described embodiments of the present invention, the CCD 13 and image circuit 14 function as an imaging means, the magnetic head 7 and playback circuit 18 function as a reading and playback means, the illumination light source 10 and illumination control circuit 17 function as an illumination means and the CPU 19 functions as a control means.

While the illustrated embodiments are preferred for the advantageous features that result therefrom, it is possible to use other types of components and/or architectures to implement the invention. For example, an illumination source other than a cold cathode discharge tube can be used. Additionally, reading and playback devices other than those that rely upon magnetic recording and reading can be used. The control architecture can be implemented using one or more discrete circuits or by a programmed general purpose computer, for example.

In the above-described embodiments, examples are shown in which the magnetic information recorded on the film is played back, but the illumination light source is turned off even when the magnetic information is read from the film.

With the embodiments of the present invention as described above, the illumination device is turned off during playback or reading of magnetic information and, consequently, the intermixing of noise generated by the illumination device with the magnetic information is prevented.

In addition, the illumination device has a structure that minimizes thermal conduction from the discharge tube to the reflector. For example, the reflector may anchor the discharge tube using projection members or via a heat-insulating member, or, the reflector and discharge tube may be anchored independently to the substrate to avoid contact between the reflector and the discharge tube. Through this structure, the temperature of the discharge tube rises promptly after the discharge tube is lighted, so that the luminance stabilizes in a short time.

Although the present invention has been described in connection with specific embodiments, it should be appreciated that modifications or changes may be made to the embodiments of the present invention without departing from the inventive concepts contained herein.

What is claimed is:

1. A film picture image viewing apparatus, comprising:
   imaging means for producing an electronic image signal from a picture image on a film;
   recording and playback means for recording magnetic information onto the film and playing back recorded magnetic information from the film;
   an illumination means that illuminates the film; and
   control means for prohibiting operation of the illumination means during recording or playback of the magnetic information by the recording and playback means.

2. The film picture image viewing apparatus of claim 1, wherein:
   the illumination means includes a discharge tube and a reflector that collects light emitted from the discharge tube, the discharge tube being mounted to the reflector in a manner that minimizes thermal conduction from the discharge tube to the reflector.

3. The film picture image viewing apparatus of claim 2, wherein:
   the reflector includes a plurality of projection members extending radially inwardly from a pair of oppositely-disposed receiving holes formed in the reflector, the discharge tube being received by the pair of receiving holes, and respective ends of the projection members contacting the discharge tube.

4. The film picture image viewing apparatus of claim 2, further comprising:
   a pair of gasket members, each gasket member fabricated from a heat insulating material and having an opening extending therethrough, wherein the reflector includes a pair of oppositely-disposed receiving holes, each receiving hole receiving a respective gasket member, and the discharge tube being retained within respective ones of the gasket openings to anchor the discharge tube within the reflector while being in thermal isolation from the reflector.

5. The film picture image viewing apparatus of claim 1, further comprising:
   a substrate connected to the film picture image viewing apparatus, and wherein the illumination means includes a discharge tube and a reflector sized and adapted to receive the discharge tube in a non-contacting relationship, the reflector and the discharge tube being anchored to the substrate independently of one another.

6. The film picture image viewing apparatus of claim 1, wherein the recording and playback means reads magnetically recorded information from the film.

7. The film picture image viewing apparatus of claim 2, wherein the reflector includes at least one aperture, at least one projection member extending from the reflector radially inwardly into the at least one aperture, a portion of the discharge tube extending through the at least one aperture and being contacted by an end of the at least one projection member.

8. An illumination device for use with a image viewing apparatus having a support substrate, the illumination device comprising:

a discharge tube that emits light when energized;

a reflector mounted to the support substrate and having a pair of oppositely-disposed ends with a receiving hole formed in each end, each receiving hole receiving portions of the discharge tube in a manner that minimizes thermal conduction from the discharge tube to the reflector after the discharge tube is energized.

9. An illumination device according to claim 8, wherein the reflector includes a plurality of projection members extending radially inwardly of each receiving hole, respective ends of the projection members contacting the discharge tube.

10. An illumination device according to claim 8, further comprising a pair of gasket members, each gasket member fabricated from a heat insulating material and having an opening extending therethrough, each gasket member being disposed in a respective one of the receiving holes in contact with the reflector, and the portions of the discharge tube extending through and contacting the openings in the gasket members.

11. An illumination device according to claim 8, wherein the receiving holes are larger in diameter than a diameter of the portions of the discharge tube so as to receive the portions of the discharge tube in a non-contacting relationship, the discharge tube being anchored to the support substrate independently of the reflector.

12. An illumination device according to claim 8, wherein the reflector is trough-shaped.

13. A film picture image viewing apparatus, comprising:

an imaging device that images a picture image on a film to produce an electronic image signal;

a recording and playback device that records magnetic information onto the film and plays back recorded magnetic information from the film;

a light source that illuminates the film; and a controller that prohibits operation of the light source during reading or playback of the recorded information by the reading and playback device.

14. The film picture image viewing apparatus of claim 13, wherein:

the light source includes a discharge tube and a reflector that collects the light emitted from the discharge tube, the discharge tube being mounted to the reflector in a manner that minimizes thermal conduction from the discharge tube to the reflector.

15. The film picture image viewing apparatus of claim 14, wherein:

the reflector includes a plurality of projection members extending radially inwardly from a pair of oppositely-disposed receiving holes formed in the reflector, the discharge tube being received by the pair of tube receiving holes, and respective ends of the projection members contacting the discharge tube.

16. The film picture image viewing apparatus of claim 14, further comprising:

a pair of gaskets, each gasket fabricated from a heat insulating material, wherein the reflector includes a pair of oppositely-disposed receiving holes, each receiving hole receiving a respective gasket and the discharge tube to anchor the discharge tube to the reflector while being in thermal isolation from the reflector.

17. The film picture image viewing apparatus of claim 13, further comprising:

a substrate connected to the film picture image viewing apparatus, and wherein the illumination device includes a discharge tube and a reflector sized and adapted to receive the discharge tube in a non-contacting relationship, the reflector and the discharge tube being anchored to the substrate independently of one another.

18. The film picture image viewing apparatus of claim 13, wherein the recording and playback device reads magnetically recorded information from the film.

19. The film picture image viewing apparatus of claim 13, wherein the image device includes a charge coupled device.

20. The film picture image viewing apparatus of claim 13, wherein the light source includes a cold cathode discharge tube.

\* \* \* \* \*